Figure 1:
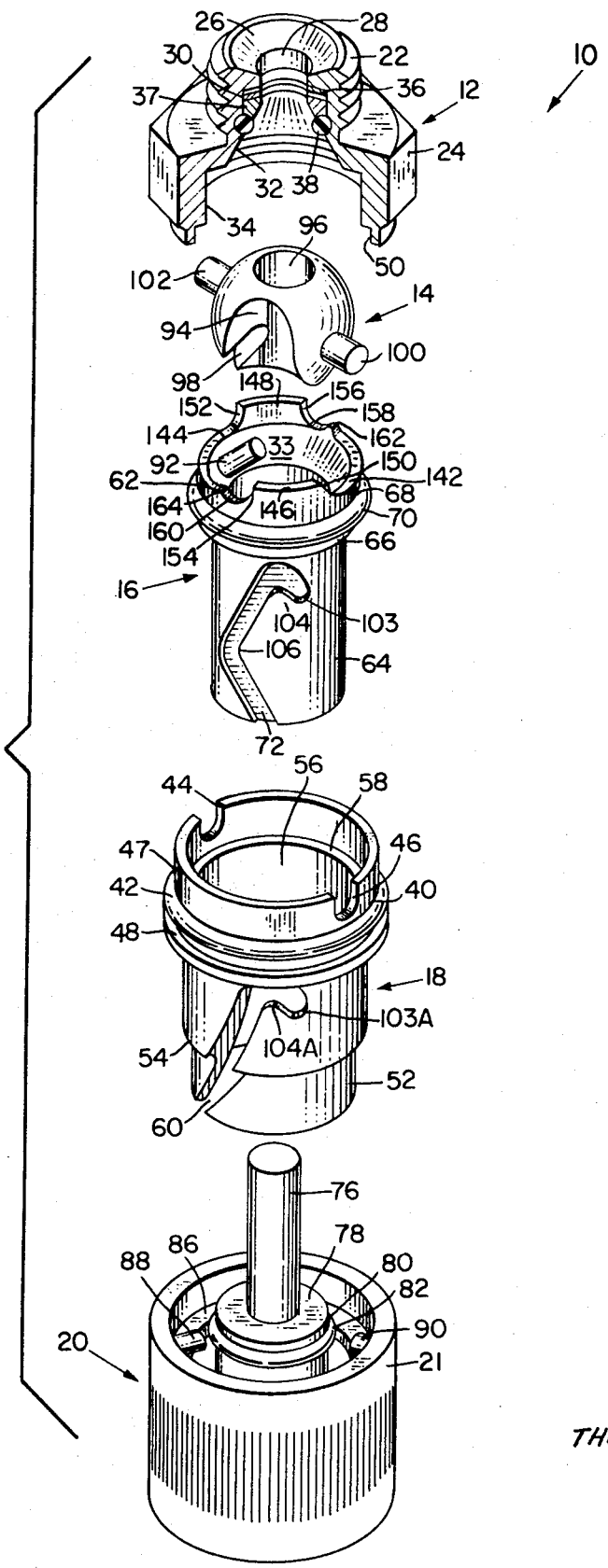

United States Patent [19]

Tauber

[11] 3,753,442

[45] Aug. 21, 1973

[54] MONITORING DEVICE AND METHOD

[75] Inventor: Thomas Tauber, Clifton Heights, Pa.

[73] Assignee: Technical Development Company, Glenolden, Pa.

[22] Filed: Nov. 1, 1971

[21] Appl. No.: 194,203

[52] U.S. Cl.................... 137/15, 137/323, 251/144, 251/149.9, 210/222
[51] Int. Cl........................................... F16k 37/00
[58] Field of Search..................... 137/317, 318, 15, 137/320, 323; 251/149.2, 65, 149.5, 149.9, 144; 222/400.7, 542; 285/361, 362, DIG. 2; 73/61 R, 64; 184/6.25; 210/222

[56] References Cited
UNITED STATES PATENTS 3,370,144  2/1968  Arthur et al.......................... 210/222
3,576,195  3/1971  Richard, Jr. ........................ 137/317

*Primary Examiner*—Martin P. Schwadron
*Assistant Examiner*—David R. Matthews
*Attorney*—Arthur H. Seidel et al.

[57] ABSTRACT

A hydraulic device suitable for installation in a vessel wall and having a positively opening and closing valve, respectively, upon the insertion and withdrawal, selectively, of another functional member. Such a member may be a magnetic debris collector, an electric chip detector, a fluid-sampling element, a thermosensitive probe, a drain attachment and any related accessory, selectively. The practice of this hydraulic device precludes the draining of the fluid and reduces the fluid spillage to a minimum when the accessory members are negotiated.

10 Claims, 7 Drawing Figures

MONITORING DEVICE AND METHOD

Devices are known which are adapted for installation within the walls of vessels, reservoirs and the like, having spring biased reciprocating valves which become closed and opened, respectively, automatically when an accessory member is inserted and withdrawn.

Those known devices have, at least, one of the following major disadvantages. Several prior art devices, especially their valves, extend into the interior of those vessels, or reservoirs, for a considerable length. Thus, the valves obstruct either the movement of the fluid, or the effectiveness of the inserted accessory. Parts extending into the oil system may become loosened and detached through the effects of vibration and shock, and enter the system and cause damage.

An automatically-acting valve which depends on the force of, at least, one mechanical spring is therefore not dependable. Foreign matter may become lodged in the valve track, and cause possible fluid spillage and other undesirable effects. Other prior art devices require a combination of manual movements for the removable member, especially, a right-angle turn with respect to and following the first removal phase. This necessitates a considerable clearance space, in more cases larger than the volume occupied by the device itself. This is particularly objectionable at aircraft engines where space is at a premium.

In contrast to prior art devices, the device in accordance with this invention can be installed in a vessel wall without extending into the interior of said vessel. Consequently, it will not interfere with the natural circulation of the fluid, nor can any part thereof, by an conceivable failure, enter the oil sump and become a hazard to the operation of the associated mechanical system the condition of which is being monitored by this device.

Another advantage of the subject hydraulic device is its valve operation through two positive-action modes.

The first positive-action mode is established between an accessory member which is negotiated in combination with said valve and the valve actuation member.

The second positive-action mode consists in the immediate engagement of the valve member through an extremity projecting from the valve actuation member into a slot formed into said valve member.

Consequently, contrary to conventional devices of this kind, the accessory can not be inserted if the valve can not be opened, and, conversely, the accessory can not be withdrawn if the valve can not be closed.

These two novel "positive-action" modes constitute the superiority of this invention over the only "automatic action" of conventional devices of this general category, primarily, because the valve operation — closing and opening — does not rely on mechanical spring forces and that both the accessory removal and insertion is possible only when the valve is completely closed and open, respectively. Therefore, inadvertent partial or complete drainage of oil which can readily occur in other devices through cocking or obstructions in the valve movement are impossible with the application of the subject device.

A further advantage of this invention is the substantially axial direction of displacement of its accessory member. The small rotational movement component required in addition to the foregoing motion is an intentionally provided inducement to rotate this accessory member into a locking position established by a nest in a co-acting cam race.

Still another advantage of the subject invention, as compared to devices of prior art, is the provision for the dependable locking of the valve member in the closed position, when the accessory member is removed. Consequently, inadvertent opening of the valve during operation of the associated mechanical system through vibration is made impossible.

A further advantage of the subject invention is the arrangement of an operating member having an upwardly open, cup-shaped container attached to that plug end which is accessible from the exterior of the subject device, including those for the draining, providing several significant and advantageous purposes. Firstly, it offers a firm grip for the negotiation of the removable accessory member. Secondly, it presents a receptacle for those minute oil quantities which may leak at valve operation and accessory withdrawal to the exterior. And, thirdly, it will retain also any liquid or solid contaminants which may have been loosely lodged upon the portion of the accessory member exposed to the interior of said vessel. Such solid contaminants may include non-magnetic particles in the case of a magnetic chip collecting accessory.

The inverted, frustro-conical recess provided by the valve port, whose lower plane is formed through the top surface of the accessory member, is another desirable and advantageous feature. Particularly in the case of a chip collecting and/or chip indicating accessory member, ferromagnetic and also non-ferro-magnetic particles will settle in that inverted truncated-cone-shaped recess under the aforementioned conditions.

Conversely, a device of the described new and advantageous characteristics, except having an intentionally protruding sensing, sampling or collecting accessory member, can be provided so as to extend into the oil flow or into regions where the turbulence of the fluid is high.

Additional advantages of this invention over prior art will become more apparent from the following description and the accompanying figures. It is to be understood that while preferred embodiments of the invention are described and shown in the figures, it should not be limited to the precise configuration illustrated, as this invention can be embodied in a plurality and variety of forms.

Figure 2:
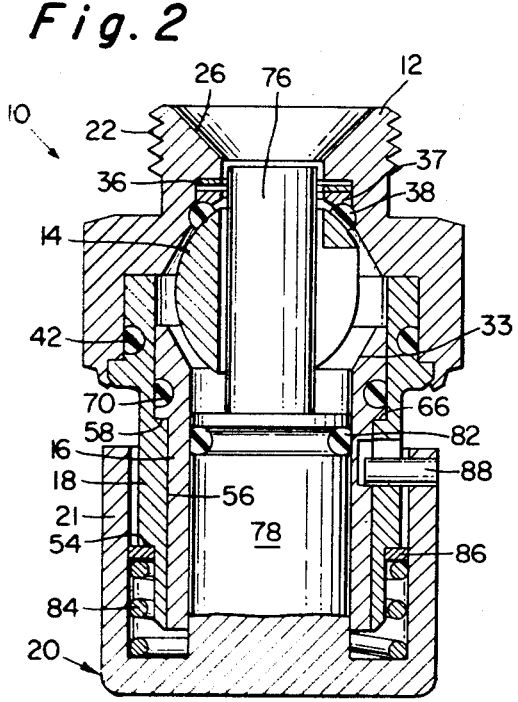
Figure 3:
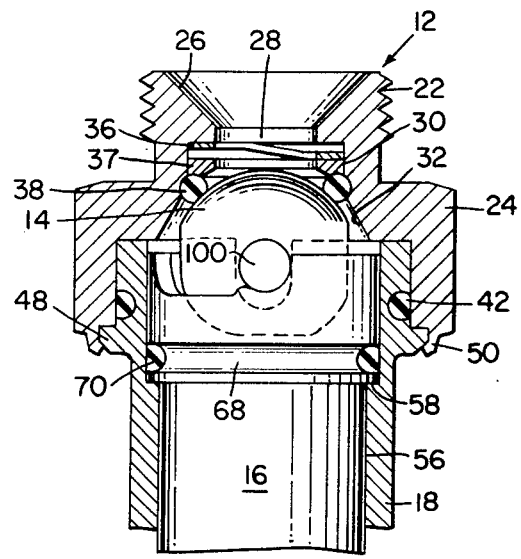
Figure 5:
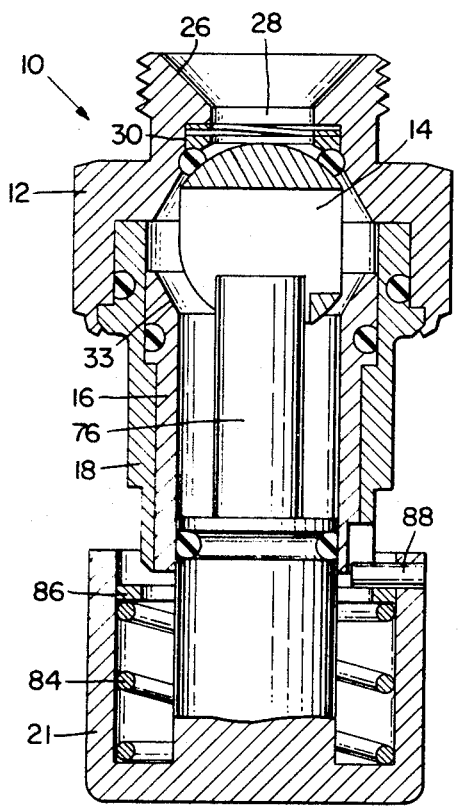
Figure 4:
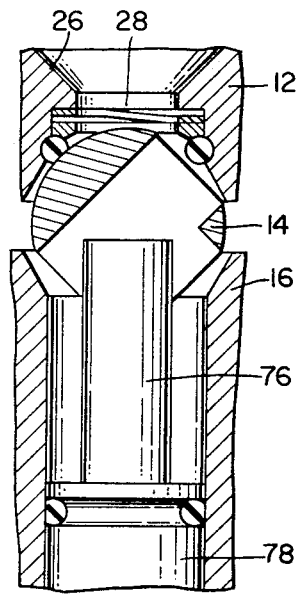
Figure 6:
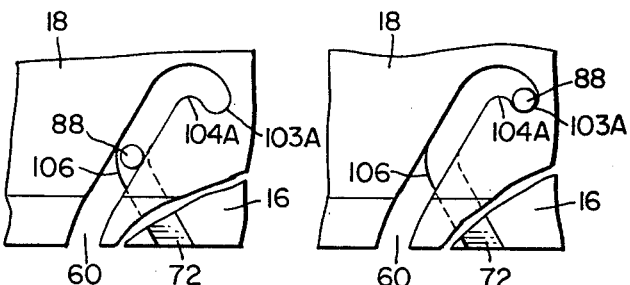
Figure 7:
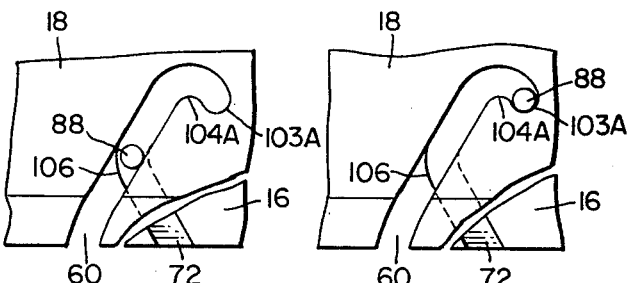

In the drawing, forming a part of this application,

FIG. 1 is an exploded view of the hydraulic device,

FIG. 2 is a cross-sectional elevation of the hydraulic device with a probe in the operational position, and the valve in the open position, FIG. 3 is another cross-sectional elevation of the hydraulic device without the probe and the valve in a closed and secured position, FIG. 4 is a cross-sectional elevation of a detail of the hydraulic device with the probe in a partly withdrawn position and the valve in an intermediate position, FIG. 5 is a cross-sectional elevation of the hydraulic device with the valve in its closed position and the removable accessory member in a position prior to complete withdrawal, FIG. 6 is a front elevation of cams, developed into the drawing plane and shown in a partly operated position, FIG. 7 is a front elevation of cams, developed into the drawing plane and shown in a mutually-locked position.

Referring now to the drawing, wherein like reference characters designate like or corresponding parts, and particularly to FIG. 1, illustrating an exploded view of a representative hydraulic device 10, its major members, namely, an essentially cylindrical valve body 12, a spherically shaped valve 14, a first cylindrical member 16, a second cylindrical member 18 and, in this case, a removable plug member 20 as a chip-collector, essentially in the order of assembly. Details may appear more explicitly in the other figures.

The cylindrical valve body 12 consists of a cylindrical, externally threaded, upper portion 22 suitable for insertion into a correspondingly tapped hole (not shown) formed into a vessel wall of a hydraulic system. The lower portion 24 of this cylindrical valve body is, for example, hexagon-shaped to accommodate wrenches or comparable fastening tools. A funnel-shaped aperture 26 is formed in the valve body interior and concentrically with its axis, continuing into a cylindrical aperture portion 28 and thence to another cylindrical bore portion 30, an inverted funnel portion 32 and a further cylindrical bore portion 34, all said portions being concentric with the axis of said valve body 12. A wave spring 36 is positioned inside and topmost of the bore 30, followed downwardly by an "O"-ring retainer 37 and a first "O"-ring 38.

The first cylindrical member 16 is essentially a hollow cylinder and mounted inside of a second cylindrical member 18, concentrically with and rotatably about the common cylinder axis. The outside diameter of its upper portion 62 is recessed along the lower portion 64, forming a first annular shoulder 66 serving as a seat upon a second annular shoulder 58 of the second cylindrical member 18. An annular groove 68 is formed into the outside of the first cylindrical member 16, into which a second "O"-ring 70 is inserted. At least one substantially helical, blind cam 72 is formed into the lateral outside of the first cylindrical member 16. This cam terminates in a nest 103, preceded by an apex 104. Additional such blind cams can be provided at specific locations of said lateral outside without affecting the principle of this invention.

The second cylindrical member 18, being also essentially a hollow cylinder, is mounted firmly within the lowest cylindrical bore portion of the valve body 12. An outwardly facing, annular groove 40 is formed into said second cylindrical member 18, accommodating a third "O"-ring 42. Two upwardly open recesses 44 and 46 are formed at diametrically opposite locations of the uppermost portion 47 of the second cylindrical member 18. A collar 48 is provided below said annular groove 40 serving as a seat between said cylindrical valve body 12 and said second cylindrical member 18. A rim 50, extending downwardly from the said cylindrical valve body 12 is crimped over the lateral side of said collar 48 at assembly. The outside diameter of the second cylindrical member 18 has a recess 52 at its lower portion forming an annular shoulder 54. The inside diameter of the second cylindrical member 18 has a recess 56 forming an annular shoulder 58. At least one cam 60 is formed into the wall of the second cylindrical member 18. This cam terminates in a nest 103A, preceded by an apex 104A. Additional such cams can be provided at specific locations in said wall without affecting the principle of this invention.

The annular top end surface of the first cylindrical member 16 is equipped with two cam-shaped recesses 142 and 144 positioned on said annular top end surface diametrically opposite to each other and adapted to support the trunnions 100 and 102, respectively, of said spherically-shaped valve 14. The rotation of the first cylindrical member 16 is then possible between two extreme positions, whereby the shoulders 154 and 156 provide stops against a rotation beyond the "closed" valve position, whereas the shoulders 150 and 152 provide stops against a rotation beyond the "open" position. As a consequence of this limited and predetermined angle of rotation of the first cylindrical member 16, a disengagement of the extremity 92 from the slot 98 in the valve 14 is not possible. Furthermore, the said cams 142 and 144 contain an apex 162 followed by a nest 158 and an apex 164 followed by a nest 160, respectively. In the "closed" valve position, the trunnions 100 and 102 of the spherically-shaped valve 14 rest in said nests 158 and 160, respectively. The downwardly biasing action of "O"-ring 38, lodged against the spherically-shaped valve 14, provides the force for a dependable securing of said valve 14, thereby preventing the opening of the valve through the effects of vibration when the removable plug member 20 is not inserted and while the valve is closed.

The removable plug member 20 contains an essentially cylindrical plug core 78. The probe chosen for this, but respesentative, embodiment of this invention is a chip collector consisting of a permanent magnet 76 of a material capable of producing an essentially constant magnetomotive force under the applicable environmental conditions. An upwardly open, cup-shaped member 21 is mounted concentrically with and at the bottom end of said removable cylindrical plug core member 78. An annular groove 80 is formed into the outside of the plug core 78 and a fourth "O"-ring 82 is inserted into said annular groove 80. A mechanical compression spring 84 is lodged inside the cup-shaped member 21, concentrically with its axis. A washer 86 is movably positioned between the inside of the cup-shaped member 21 and the outside of the second cylindrical member 18. The mechanical compression spring 84 biases the movable washer 86 against annular shoulder 54 of said second cylindrical member 18.

A cylindrical extremity 88 is mounted, for example, on the cup-shaped member 21 near its edge and facing radially inwardly. The diameter of said extremity 88 is somewhat smaller than the width of each cam 60 and 72. The free length of the extremity 88 is such as to engage simultaneously the cams 60 and 72. Additional such radially and inwardly facing extremities can be provided, each to engage with any such additional pair of cams, without affecting the principle of this invention. It should be noted that the extremity 88 also provides an upper stop for the movable washer 86 whenever the removable plug member 20 is removed from the valve assembly. To level the washer 86 in this position, stems 90 are provided at various other locations along this interior cup elevation as required.

A further extremity 92 is mounted on the upper, funnel-shaped portion 33 of the first cylindrical member 16 in a direction radial with respect to the spherically-shaped valve 14 and capable of causing the rotation of the spherically-shaped valve through engagement between this extremity 92 and a co-acting aperture 98 in the spherically-shaped valve 14.

The spherically-shaped valve 14 is essentially a sphere having various apertures formed therein. The aperture 94 serves primarily as a clearance between the rotating movement of the valve 14 and the linear movement of the probe 76. This aperture 94 terminates in a cylindrical bore 96, appearing at the pole of the sphere as shown in FIG. 1, and being concentric with the axis of the sphere. Another aperture, the slot 98 is formed into the spherically-shaped valve 14 along one of its meridians. A trunnion 100 is provided concentric with a diameter of the spherically-shaped valve 14 in a horizontal direction perpendicular to the plane of symmetry of the aperture 94, and another trunnion 102 on the corresponding, diametrically opposite side of the sphere. The remaining solid portions of the spherically-shaped valve 14 serve as closures for the hydraulic device in cooperation with the "O"-ring 38, and as structural valve portions, respectively. The spherically-shaped valve 14 is mounted rotatably, by means of the trunnions 100 and 102 within the recesses 46 and 44 of the second cylindrical member 18. In this arrangement, the wave spring 36 biases the "O"-ring retainer 37 and the "O"-ring 38 against the spherically-shaped valve 14.

The helical cams 60 and 72 have the following, respective characteristics: This cam pair is jointly and simultaneously engaged by, say, the extremity 88 of the cup-shaped member 21, commensurate with the presentation in FIG.'s 6 and 7, showing the cams 60 and 72 developed into the drawing plane. Starting with nest 103 and apex 104 of cam 72, and nest 103A and apex 104A of cam 60, the races of the two cams 60 and 72 are registering with each other until the knee 106 of cam 72, in the first cylindrical member 16, is reached by the extremity 88. During this operational phase, only the removable plug member 20 is in motion. This movement in advance of, especially, that of the valve 14 is required to clear the probe 76, together with any fragments collected on it, especially in the case of a chip-collecting removable accessory, through the respective apertures of the valve 14. From this point on, the helical cam 60 in the second cylindrical member 18 continues in its former direction, whereas the cam 72 in the first cylindrical member 16 changes its direction which results in the rotation of the first cylindrical member 16 with respect to the stationary second cylindrical member 18 and, by means of extremity 92 engaging aperture 98, in the rotation of the valve 14 when extremity 88 is moved through this portion of cam 60.

The operation of the hydraulic device is as follows: Considering an open valve condition with all parts of the device as shown in FIG. 1, however assembled, and bearing in mind that the second cylindrical member 18 is permanently mounted to the cylindrical valve body 12, the removable plug member 20 is first raised and rotated, overcoming the forces exerted by the mechanical compression spring 84, biasing the removable plug member 20 away from annular shoulder 54 of the second cylindrical member 18. The extremity 88 of the cup-shaped member 21 can now escape from the nests 103 and 103A and over apex 104 and 104A, respectively, in cams 72 and 60. So long as the extremity 88 proceeds along the jointly registering portions of the cams 72 and 60, the probe 76 merely passes through the other device parts, in a manner described in the foregoing for this operational phase. As soon as, upon further withdrawal of the removable plug member 20, in a downwardly direction, its extremity 88 proceeds beyond the knee 106 of the cam 72, the first cylindrical member 16 becomes rotated about the axis common to both the first and the second cylindrical member, 16 and 18, respectively. The extremity 92 of the first cylindrical member 16, engaging the slot 98 of the spherically-shaped valve 14 causes the rotation of the latter about its trunnions 100 and 102 which are lodged, stationarily, within the recesses 46 and 44 of the second cylindrical member 18 and supported by cams 142 and 144 of the first cylindrical member 16, thereby closing the cylindrical aperture portion 28. Furthermore, towards the end of the rotational motion of the spherical-shaped valve 14, the trunnions 100 and 102 are deposited into the nests 158 and 160 of the cams 142 and 144, respectively.

Any, however small, fluid quantity which may have leaked during the withdrawal of the removable plug member 20 through the aforementioned operational phases, will enter the cup-shaped member 21 upon complete removal of plug member 20 to be examined and discarded, respectively.

The insertion of the removable plug member 20, the engagement between extremity 88 of the cup-shaped member 21 with the cams 60 and 72, the rotation of the first cylindrical member 16 with respect to the stationary, second cylindrical member 18, the rotation and opening of the spherically-shaped valve 14, through engagement of the extremity 92 with aperture 98 and the unlocking of the trunnions 100 and 102 from nests 158 and 160, respectively, as well as the locking of extremity 88 into nests 103 and 103A, occur in the reversed sequence compared with the foregoing description of the valve closing process, for a valve-opening operation.

It should be noted that the slight rotational movement required for the unlocking of the removable cup-shaped member 21 induces the operator to follow the pitch of the cam 60 more conveniently during the withdrawal of the removable plug member 20. However, in principle, the cams 60 and 72 can be of other than helical form or may both consist of portions of helices with varying degrees of pitch, so long as they provide a common slope for the aforementioned first operational plug member withdrawal phase and, subsequently, such a difference in their pitches which will assure the operation and securing of the valve upon the insertion and removal of the removable plug member.

On the basis of the foregoing description, it becomes apparent that the hydraulic device in accordance with this invention provides positive-action engagements among all moving parts, convenient installation and straight-forward insertion, withdrawal and servicing of the probe with a minimum of dexterity or personnel skill. It is also apparent that the negotiation of the probe and the valve can be accomplished with a bare minimum of fluid spillage whereby even this minute quantity of fluid will be collected in the upwardly-facing interior of the cup assembly 20.

One of the feasible probe configurations may be that of a magnetic chip collector for use with oil sumps of aircraft, mobile and stationary engines, gear cases and accessories, respectively. Another probable probe style may be that of a chip detector instead of and in addition to that of a chip collector, selectively, indicating the collected chip quantity and the possible danger to a, say, remote caution and warning station. Still a further probe variety may be a temperature, pressure, flow and viscosity sensing element, respectively, to mention but a few additional configurations. It is also possible to equip the removable plug member 20 with a sampling container and a drain-hose, respectively, so as to examine the fluid and drain it, selectively, likewise without fluid spillage during the cup assembly connection.

Conversely, the herein shown and described mechanical transmission from the removable plug member and the probe, respectively, to the spherically-shaped valve may be modified within the frame of this invention.

What is claimed is:

1. A method for monitoring and protecting a hydraulic system in a selective manner comprising
    a. a hydraulic system wherein a valve body has a rotatable valve and is installed in a vessel wall, the step of inserting a probe into the valve body in one axial direction with respect to the valve body,
    b. rotating the valve from its closed position to an open position by positive engagement between said probe and said valve, then securing said valve in its open position,
    c. advancing said probe in said axial direction to its operational position through and beyond said valve,
    d. locking said probe in its operational position and with respect to said valve body,
    e. unlocking said locked probe from its operational position upon completion of a mission phase, withdrawing said probe from its operational position in a direction opposite to said first-mentioned axial direction,
    f. moving said valve to its closed position by positive engagement between said probe and said valve during withdrawal of said probe,
    g. securing said valve in its closed position, and
    h. removing said probe with respect to said valve body.

2. The method of monitoring the contents of a vessel comprising the steps of inserting a probe into a valve body in one axial direction with respect to a valve body which has therein a valve and which is installed in a vessel wall without projecting into the vessel, rotating said valve from a closed position to an open position by engaging the valve with the probe during said step of inserting the probe, advancing said probe in said first axial direction to an operational position wherein an end of said probe is exposed to the contents of the vessel, locking said probe in its operational position through a first rotational movement with respect to said valve body, unlocking said probe from its operational position through a second rotational motion with respect to said body, withdrawing said probe from its operational position in a second opposite axial direction, rotating the valve from its open position to a closed position in response to said step of withdrawing the probe, and removing said probe from said valve body together with any particles and substances collected by said probe.

3. A hydraulic device for the monitoring and protecting, selectively, of a hydraulic system, comprising:
    a cylindrical valve body, having an aperture, adapted to be installed into a vessel wall of a hydraulic system,
    a spherically-shaped valve having a slot and aperture formed therein and having trunnions extending therefrom at opposite ends a diameter so as to rotatable about said two trunnions within said valve body adapted to open and close, selectively, said valve body aperture,
    a first cylindrical member having two ends and, at least, one cam of a first configuration formed in its lateral outside, adapted to engage said spherically-shaped valve, located inside of, concentric with and rotatable about the axis of said cylindrical valve body,
    a second cylindrical member having two ends and having, at least, one cam of a second configuration and adapted to coact with said cam having a first configuration formed in its lateral outside, said second cylindrical member positioned partially within said valve body but on the outside of and concentric with said first cylindrical member and the axis of said cylindrical valve body,
    a removable plug member having, at least, one extremity formed therein adapted to engage said cam of said first cylindrical member simultaneously with said cam of said second cylindrical member upon its insertion and withdrawal, selectively, so as to effect a controlled rotational motion of said first cylindrical member about said axis common to both said cylindrical members and the rotation and the securing of said spherically-shaped valve from a first extreme position to a second extreme position and to establish an open, cylindrically-shaped passage for the complete insertion and withdrawal, selectively, of said removable plug member in one first and one second axial direction, selectively, with respect to said valve body.

4. A hydraulic device as defined in claim 3, wherein at least one said cylindrical member having at least one said cam of a substantially helical configuration in its lateral side, said helical cam configuration having portions of varying pitch increments adapted to effect mutual locking among said first and said second cylindrical member and said removable plug member against any inadvertent rotation.

5. A hydraulic device as defined in claim 3, wherein said first cylindrical member is equipped on its upper end with one cam pair, each cam of each said cam pair being at a diametrically opposite position with respect to the other, and a pair of nests, each nest of each said pair of nests at a diametrically opposite position with respect to the other, and each such nest arranged adjacent to each such cam, an apex preceding each said nest, each said nest adapted to receive and to release, selectively, one said trunnion of said spherically-shaped valve upon the insertion and the withdrawal, selectively, of said removable plug member, said apexes and said nests effecting a dependable locking position for said trunnions of said spherically-shaped valve when said removable plug member is not inserted so as to preclude an inadvertent opening of said spherically-shaped valve, and providing distinct terminations for the rotation of said first cylindrical member so as to secure a permanent engagement among said extremity formed on the lateral inside of said first cylindrical member and the said coacting slot formed in said spherically-shaped valve through the coaction among said helical cam in said first cylindrical member and said helical cam in said second cylindrical member and said extremity in said removable plug member.

6. A hydraulic device as defined in claim 3, wherein the external structure of the removable plug member is shaped so as to form at its lower end an upwardly open cup adapted to collect any substance which may have leaked through said hydraulic device during the operation of said spherically-shaped valve through the negotiation of said removable plug member.

7. A hydraulic device as defined in claim 3, wherein said helical cam in said first cylindrical member is adapted to coact with said helical cam in said second cylindrical member so that the movement of said spherically-shaped valve is intentionally delayed with respect to the movement of said removable plug member providing a clearance phase for the partial withdrawal of the removable plug member together with any particles and substances collected on said removable plug member, and a valve closing prior to the total withdrawal of said removable plug member, and providing for a partial insertion of said movable plug member prior to the opening of said spherically-shaped valve, selectively.

8. A hydraulic device for the monitoring and protecting, selectively, of a hydraulic system, comprising:
a cylindrical valve body containing packing and biasing means and having an operational cylindrical aperture formed therein, adapted to be installed into a vessel wall of a hydraulic system,
a spherically-shaped valve having a slot and an operational cylindrical aperture formed therein, having two trunnions extending therefrom in an axis perpendicular to said operational aperture, one trunnion positioned diametrically opposite to the other so as to be rotatable about said two trunnions within said valve body and against said biasing packing and adapted to open and close, selectively, said valve body aperture,
a first cylindrical member having two ends located inside of, concentric with and rotatable about the axis of said cylindrical valve body, the upper end having at least one cam and an apex and a nest adjacent to said cam formed thereon, and at least one cam of a first configuration formed in its lateral outside, and at least one annular seat formed on its outside, and an extremity formed on its lateral inside adapted to engage said slot of said spherically-shaped valve,
a second cylindrical member having two ends, located within said valve body but outside of and level with said first cylindrical member and concentric with the axis of said cylindrical valve body, the upper end having along a diameter one vertical slot at each opposite end of said diameter and having at least one cam of a second configuration formed in its lateral outside, one annular seat formed on its inside and two annular seats formed on its lateral outside,
a removable cylindrically-shaped plug member having two ends, a permanent magnet mounted on its top end and an upwardly open, cup-shaped member mounted on its bottom end, at least one inwardly oriented extremity mounted horizontally on a lateral wall of said cup-shaped member adapted to engage said cam in said first cylindrical member simultaneously with said cam in said second cylindrical member so as to cause a rotation of said first cylindrical member about said second cylindrical member together with a rotation of said spherically-shaped valve upon the insertion and removal, selectively, of said removable plug member in one first and in second axial direction, selectively.

9. A device comprising a cylindrical valve body adapted to be installed in a vessel wall, said valve body having an aperture, a valve member for cooperation with said aperture to affect opening and closing of the aperture, said valve member having trunnions extending from opposite ends thereof and being rotatable about the axis of said trunnions within the valve body, a cylindrical member inside the valve body and rotatable about a second axis which is perpendicular to the trunnion axis, a removable plug member having one extremity to be exposed to the contents of the vessel, means connected to the plug member for rotating said cylindrical member as the plug member is inserted therethrough along the second axis, means on the cylindrical member for rotating said valve member about the trunnion axis as the cylindrical member rotates, and said valve member having an opening alignable with said aperture and of a sufficient size so that the plug member may extend therethrough, a means for affecting a seal between said cylindrical member in the valve body.

10. A device in accordance with claim 9 wherein said plug member extremity is of magnetic material, and a cam means on said cylindrical member angularly disposed with respect to said second axis, said cam means cooperating with the means on the plug member for rotating the cylindrical member, whereby rotation of the cylindrical member is affected by axial and rotatable movement of the plug member.

* * * * *